No. 840,849. PATENTED JAN. 8, 1907.
A. W. HUTCHINS.
METHOD OF FORMING GLASS BLOWN BOTTLES AND MOLDS THEREFOR.
APPLICATION FILED MAY 7, 1906.
2 SHEETS—SHEET 1.
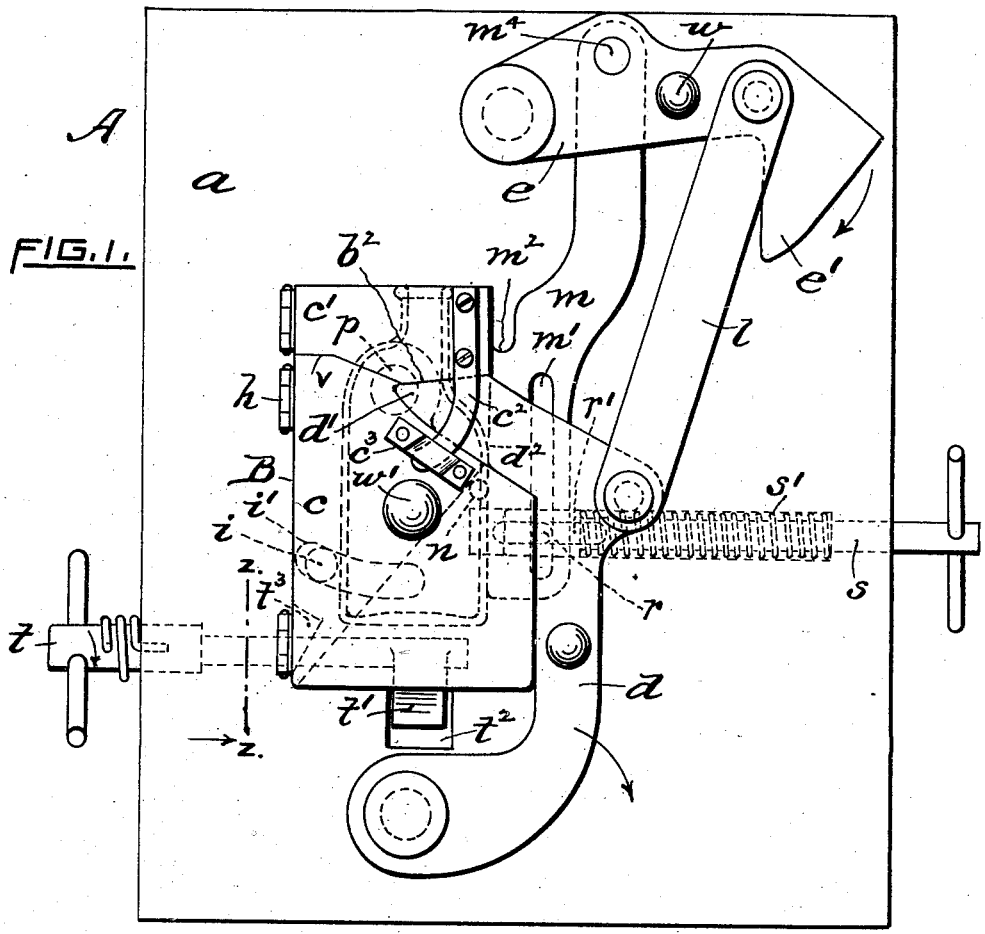
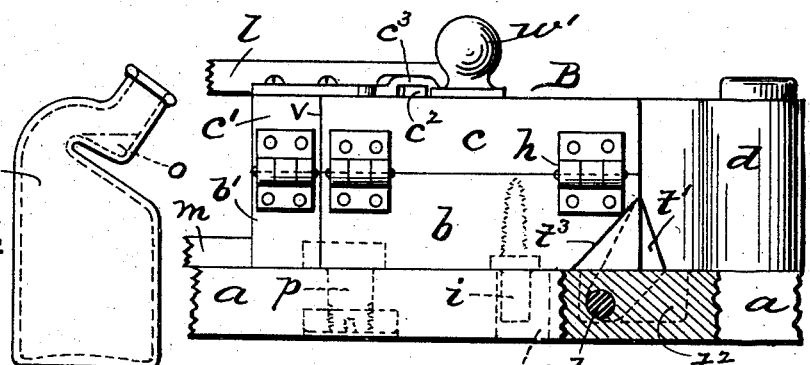
WITNESSES. INVENTOR.
Arthur W. Hutchins.

No. 840,849. PATENTED JAN. 8, 1907.
A. W. HUTCHINS.
METHOD OF FORMING GLASS BLOWN BOTTLES AND MOLDS THEREFOR.
APPLICATION FILED MAY 7, 1906.
2 SHEETS—SHEET 2.
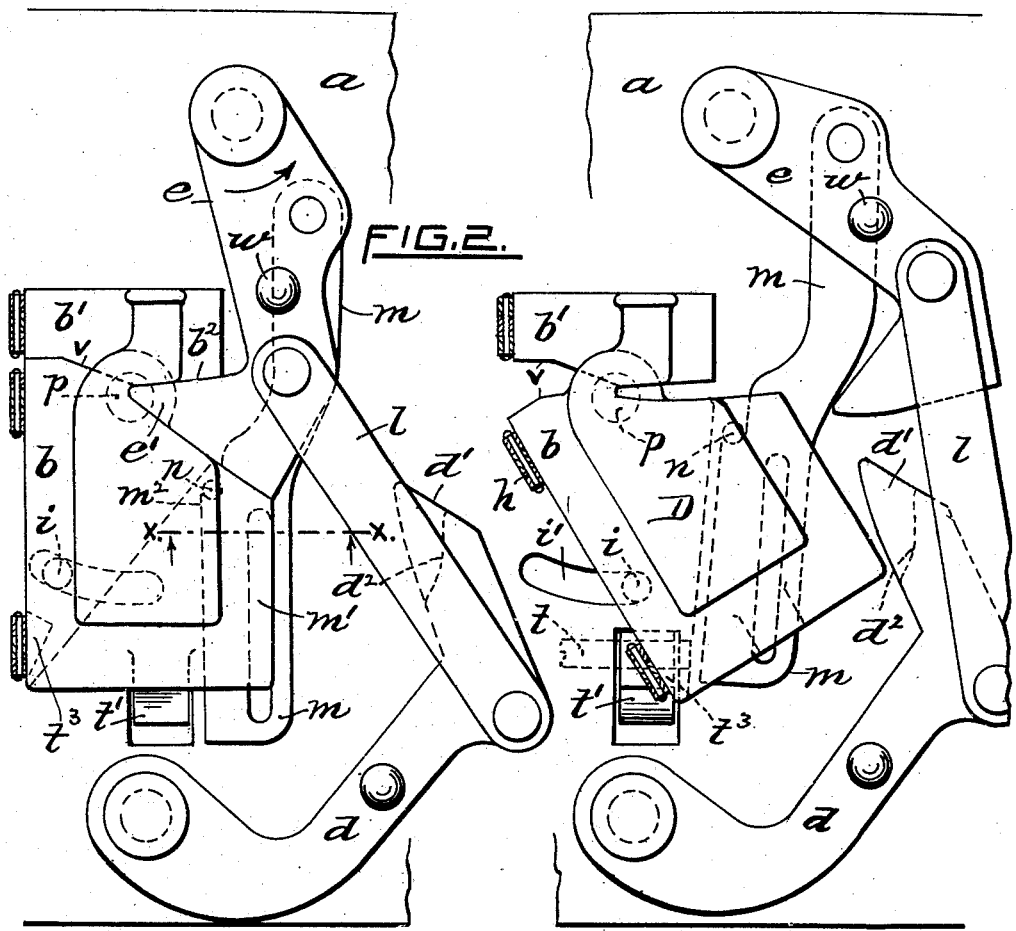
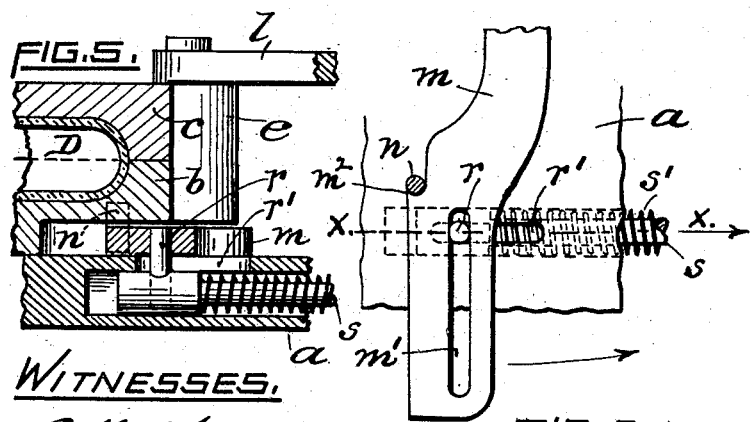
WITNESSES. INVENTOR.
Arthur W. Hutchins
By Geo. H. Remington,
Atty.

UNITED STATES PATENT OFFICE.

ARTHUR W. HUTCHINS, OF PROVIDENCE, RHODE ISLAND.

METHOD OF FORMING GLASS BLOWN BOTTLES AND MOLDS THEREFOR.

No. 840,849.      Specification of Letters Patent.      Patented Jan. 8, 1907.

Application filed May 7, 1906. Serial No. 315,464.

*To all whom it may concern:*

Be it known that I, ARTHUR W. HUTCHINS, a citizen of the United States of America, and a resident of Providence, in the county of Providence and State of Rhode Island, have invented certain new and useful Improvements in Methods of Forming Glass Blown Bottles and Molds Therefor, of which the following is a specification.

My present invention relates to novel improvements in the manufacture of "dose-measuring" bottles, so called, and in molds therefor. An example of a bottle of the class referred to is shown and described in United States Patent No. 570,759, wherein the neck portion of the bottle is offset or upwardly inclined from the center of the body and also reversely bent and terminates in an outlet or nozzle arranged at substantially right angles to the said inclined portion of the neck.

Heretofore in the manufacture or molding of bottles having the necks thereof provided with integral dose-measuring members a great amount of labor, time, and money have been expended, the result being that bottles of this type have not hitherto been successfully and commercially produced and introduced owing to the materially increased cost of manufacture as compared with the plain or usual type of bottle.

The object I have in view is to provide the bottle-maker with a mold or means in the manipulation of which he is enabled to readily, easily, and successfully produce dose-measuring bottles in a comparatively inexpensive manner, the cost being not much, if any, in excess of that involved in making the usual plain bottle.

In order to properly blow bottles in the molds as usually constructed, as in producing bottles having the necks at the center thereof, the glass-blower keeps the blowpipe in the center of the work, so that the stock or glass can expand equally on all sides of the mold. In the production of bottles where the neck is to be offset or non-central with relation to the body portion, as in making dose-measuring bottles, the thickness of the glass at the side nearest the neck is liable to be much greater than that of the side farthest from the neck. In order to overcome this defect as much as possible, the practice heretofore has been substantially as follows: The blower first blows the body portion of the bottle as near the center of the blowpipe as practicable. Then while the glass is still hot the neck or stem is drawn to one side of the body, after which the long neck is bent at right angles to the bottle in that portion of the mold which forms the measuring part or member, thus necessitating a great amount of extra work as compared with the time, &c., involved in making a common bottle.

By means of my invention the glass-blower is enabled to make a dose-measuring bottle with facility and economy—that is to say, by the use of my improved mold all the former difficulties attending the manufacture of dose-measuring bottles are so reduced that the operation is practically as simple as that employed in making ordinary bottles. The first step in the operation after the mold-boy closes the sections of the mold around the mass of hot glass or stock is for the blower or skilled workman to blow the glass so as to fill the mold, thus resulting in the production of a plain bottle having a substantially central neck. It may be stated that one side of the improved mold is cut away contiguous to the junction of the neck and body portions of the bottle, the corresponding opening thus made being substantially V-shaped and filled by a swinging initial-forming section or member in which is formed that portion of the matrix proper constituting the complementary part of the mold. The mold-boy next retracts said swinging member from the mold, thereby exposing the corresponding part of the still hot and plain bottle, and at the same time swings into the said open space or gap another V-shaped, but solid member, thus filling the space and concurrently forcing the glass laterally to form a bend or "gooseneck" in the upper part of the bottle. I may explain that the major or base portion of the mold is pivotally mounted at or near the point or apex of the V-opening and is locked in the normal position during the preceding steps. The mold is next unlocked and swung upwardly to its limit and resecured, the still hot glass readily adapting itself to said changed position, thereby completing the formation of the bottle. The mold is next opened and the bottle removed therefrom, followed by returning the several parts to the normal position preparatory to repeating the bottle-making operation. While the several steps have thus been described at length, in practice, however, the operations are effected easily, rapidly, and accurately by the mold-boy, the skilled workman at the same time simply keeping the plastic glass (incased in the mold) distended by blowing so as to completely fill the mold, the subsequent manipulations of it whereby the plain bottle therein is transformed or converted while hot into the dose-dispensing bottle being readily and quickly accomplished by the mold-boy in coöperation with the blower's work, as just stated.

In the accompanying two sheets of drawings, Figure 1 illustrates in plan view my improved mold, the several parts being shown in the normal position or relation and also showing the plain bottle blown therein. Fig. 2 is a similar view showing the grooved or initial-forming section temporarily removed from the mold and the plain or ungrooved section substituted therein preparatory to producing the bend in the neck, the top or front half of the mold or flask and some of the other parts being omitted. Fig. 3 is a similar top view, but showing the lower or swinging portion of the mold swung upwardly to its limit to complete the bend, whereby the axis of the neck is formed at an angle with that of the body portion and corresponding with the completed bottle. Fig. 4 is a partial plan view showing more in detail the relation of the latch, &c., corresponding with the position represented in Fig. 2. Fig. 5 is a vertical sectional view taken substantially on lines $x$ $x$ of Figs. 2 and 4. Fig. 6 represents a partial side elevation of the mold partly in section as viewed from the left of Fig. 1, the section part taken on line $z$ $z$ of the latter figure; and Fig. 7 is a front elevation of the completed dose-measuring bottle detached from the mold.

The following is a more detailed description of my improved portable mold A and the manner of operating the same in producing bottles.

As drawn, the several parts are mounted on a flat base $a$. The interiorly-recessed mold or flask proper, B, except the parts later described, consists of the flat back or bottom sections $b$ and $b'$ and corresponding front sections $c$ and $c'$, superposed upon and hinged to the first-named sections. The adjacent flat faces of the upper and lower sections are made true and parallel, each being recessed and forming the counterpart of one-half of the bottle or other article to be produced or molded therein. The lower neck-forming section $b'$ is stationary and has the upper fellow section $c'$ hinged thereto. The lower or body-forming section $b$ is pivoted to the base $a$ by means of a pin $p$, located at or near the center of the irregular joint-line $v$. (Shown clearly in Figs. 1 and 2.) The fellow or upper member $c$ is hinged to part $b$ substantially as shown or in any suitable way.

The side or edge of the body part of the mold opposite the hinged side, and which I designate the "inner edge," is cut at an angle, thereby forming in conjunction with the corresponding edge of parts $b'$ and $c'$, a substantially V-shaped opening $b^2$, its apex being located, as drawn, at or near the center of said pivot $p$. A curved slot $i'$ is formed in the base $a$, in which a pin $i$, secured to the bottom of mold member $b$, is adapted to move. This slot limits the movement of the mold when the latter is swung from its normal position.

A spring-pressed horizontal rod $t$ is axially movable in the base $a$, its inner end having a latch or dog $t'$ secured thereto and movable in recess $t^2$ and arranged to engage and interlock with a notch formed in the lower edge of member $b$, whereby the latter is normally secured in position against lateral movement.

Two suitably shaped and positioned swinging levers $e$ and $d$ are pivoted to the base and connected together by a link $l$, the arrangement being such that the levers are adapted to move simultaneously, but at varying angular distances. The free ends of said levers are each shaped so as to conform to and snugly fill the said mold-opening $b^2$ and when in use forming the complementary section thereof. The end portion $d'$ of lever $d$, which may be termed the "primary forming-section," is cut away, as indicated by dotted line $d^2$, so as to form, when in use and in conjunction with the other members, the complement or finished mold. A bottle then produced in the mold would have, say, the normal form represented by dotted lines in Fig. 1. The free end $e'$ of the other lever $e$ is solid or ungrooved. The lever also has a flat latch-bar $m$, jointed thereto at $m^4$, its lower portion having a longitudinal slot $m'$ and an inner side notch $m^2$, the latter, when the bar is sufficiently depressed, being arranged to automatically engage a suitably-positioned pin $n$, secured to and depending from the under side of mold-section $b$. An endwise-movable spring-pressed rod $s$ extends horizontally in the base $a$ and carries at its inner end a pin $r$, movable in the elongated opening $r'$, formed in the upper side of the base and also being in operative engagement with the said slot $m'$ of the bar $m$. (See also Fig. 4.) Thus it will be seen that the act of retracting lever $d$ from the normal position, Fig. 1, in the arrow direction forcibly swings the lever $e$, connected therewith, downwardly past the end $d'$ and into the then open space $b^2$. At the same time the guided latch-bar $m$ is forced downwardly and laterally, the notch $m^2$ thereof automatically engaging the mold's pin $n$ and practically locking the bar and mold-section together. Figs. 2 and 4 represent the corresponding position and relation of the parts. Now in order to rotate the said mold-section on its pivot $p$ the latch or dog $t'$ is swung rearwardly to unlock the mold, followed by swinging lever $e$ out of the opening $b^2$, the interlocked bar $m$ at the same time operating to vibrate the mold upwardly to its limit or until arrested by the engagement of the pin $i$ with the end of the slot $i'$, the dog $t'$ meanwhile automatically moving upwardly into engagement with the outer notch $t^3$ of the mold member, thereby locking the latter in the flexed position, all as indicated in Fig. 3.

The top members of the mold B may be movably connected together by the bent flat bolt $c^2$, fast to member $c'$ and coöperating with member $c^3$, secured to the part $c$ of the mold, as shown in Fig. 1.

In order to produce the dose-measuring bottle D, (represented in Fig. 1,) the top or cover part of the already-locked mold is first opened by means of handle $w'$ or other suitable device, followed by placing the properly-heated and tube-connected glass bulb in the open matrix-chamber and reclosing said top part, thereby inclosing the bulb therein. The movable section $d'$ is next placed in position, the parts then appearing as represented in Fig. 1. The workman now blows the glass until it covers or conforms to the entire surface of the mold-cavity, the bottle then having a corresponding shape, as indicated in Fig. 1, the blow-tube, however, being omitted. The mold-boy next withdraws said section $d'$ from the mold-opening $b^2$ and simultaneously inserts section $e'$ therein to its limit, thereby indenting and changing the adjacent portion of the hot glass to a V-shaped form, said movement at the same time causing the latch-rod $m$ to move into engagement with the drawing-pin $n$ of the mold. (See Fig. 2.) After depressing the dog $t'$, thereby unlocking the mold, the mold-boy next swings the lever $e$ upwardly, thus withdrawing the said section $e'$ from the mold and at the same time causing the bar $m$ connected with the lever and mold to swing the latter on its pivot $p$ until the moving pin $i$ is arrested by the end of slot $i'$, thereby practically closing the V-shaped opening formed in the bottle, the dog $t'$ at the same time automatically engaging the outer notch $t^3$ of the mold and locking the latter in its changed or angular position. The corresponding relation of the parts is represented in Fig. 3. The mold is next opened, the bottle D, (then having the measuring-cavity $o$,) removed therefrom, and the said pivoted portion of the mold swung back to its original or normal position, first, however, unlocking it from the dog member $t'$, the latter reëngaging the central notch, when the mold becomes normally stationary, as stated. The locking-bar $m$ is next, by means of the pull-rod $s$, released from the pin $n$, thereby freeing the lever $e$ and permitting it to be retracted preparatory to introducing another bottle charge into the mold, closing the latter, again inserting the section $d'$ into the opening $b^2$, and followed by the other steps, as before described.

While glass-blowers' molds heretofore employed have been separable or hinged and adapted to produce therein bottles or articles having simply the form and dimensions of the normal matrix or mold cavity, they were not so constructed and arranged that the normal bottle while still heated and remaining in the mold could be transformed into a different shape. My improved mold is well adapted to the blowing or production therein of a plain or normal bottle, which immediately thereafter may be easily and quickly changed to a different predetermined form by simply manipulating certain movable or auxiliary members of the mold, thereby completely shaping the work before the mold is opened to remove it therefrom. This feature or principle discovered by me is embodied and employed in my improved mold, illustrated and described herewith, the result being, substantially as stated, that the re-forming of a plain or initially-formed bottle while contained in the mold during its complete production may be made by the glass-blower and his assistant nearly as rapidly and cheaply as a plain bottle molded in the usual manner. Thus it is evident that the invention possesses great economic advantages over the means and methods heretofore employed in commercially producing, say, dose-dispensing bottles or other peculiarly-shaped articles of glass in which a sharp bend or acute angle is formed in the walls thereof and wherein the thickness of the latter is to be substantially uniform throughout, the fact being borne in mind that it is practically impossible to blow the glass uniformly around a comparatively sharp edge or similar obstruction fixed in the mold.

I claim as my invention and desire to secure by United States Letters Patent—

1. The improvement in the process of producing glass blown bottles in separable molds, the same consisting in introducing the charge of heated glass into the open mold, then closing the mold and blowing said charge of glass so as to normally fill the mold's matrix thereby forming an initial or normal bottle, then manipulating a side section of the mold so as to produce an indentation in and located at or near the base of the neck of the still heated and confined bottle, and then opening the mold and removing the bottle therefrom.

2. An improvement in the process of producing glass blown bottles in separable molds, the same consisting in blowing the heated glass or charge confined in the mold so as to form an initial or normal bottle, removing a portion of the mold and substituting another member therefor to change the form of the corresponding part of the bottle, followed by withdrawing the said substitute member from the mold and at the same time changing the axial relation of the body and nozzle portions of the bottle to each other while still confined in the mold, and then opening the mold and removing the practically completed bottle therefrom.

3. The method of producing in a separable mold a blown-glass bottle having an irregular shape from a plain or normal shaped bottle while the latter is still in a plastic state and confined in said mold, which consists in removing a section of the mold and exposing the corresponding part of the bottle, introducing a forming-section into the mold in lieu of said removed section to engage and re-form the said exposed part of the bottle, then removing the forming-section, followed by swinging portions of the mold proper to practically close the opening uncovered by the said removed section, and then opening the mold and removing the completely-shaped bottle therefrom.

4. As an improved article of manufacture, a separable normally closed mold having a portion of its side wall and including the corresponding part of the matrix cut away or removed at a point contiguous to the base of the neck of the bottle so as to expose the adjacent part of the mold's interior, and a manually-movable section operatively connected with the mold, the same also forming the counterpart of and adapted to fit and close said cut-away portion of the mold and at the same time forming the complementary part of the matrix.

5. A separable mold for shaping glass blown bottles, the same comprising a plurality of manually-movable sections, one of which extends transversely into the mold's matrix at a point contiguous to the base of the bottle's neck thereby adapting the mold to produce a normal shaped bottle, and a transforming-section operatively connected with and forming a part of the mold, adapted and arranged to be temporarily substituted for the first-named section for changing the form of the bottle's body adjacent the neck while the bottle is still confined in the mold, substantially as hereinbefore described.

6. The combination with a separable bottle-mold having the major or body portion thereof pivotally mounted, and having the sides or edges of the stationary and movable portions adjacent the pivot-point cut away to form a lateral opening extending into the matrix, of operatively-connected forming and transforming sections adapted to be successively introduced into and removed from said opening, and means connected with said pivotally-mounted part of the mold for swinging the latter from the normal position, substantially as hereinbefore described and for the purpose set forth.

7. The combination with a separable bottle-mold having the major or body portion thereof pivotally mounted, and having the sides or edges of the stationary and movable portions adjacent the pivot-point cut away to form a lateral opening extending into the matrix, of operatively-connected forming and transforming sections adapted to be successively introduced into and removed from said opening, a latch movable with said section members adapted to connect with said pivotally-mounted part of the mold to swing the latter from the normal position, and means for locking the mold in said normal and changed positions.

8. The combination with a separable mold having fixed and movable portions and a lateral opening extending into the matrix thereof, of connected swinging forming and transforming members, $d'$ and $e'$, respectively, adapted to be successively introduced into and withdrawn from said mold-opening, means for swinging the main or body portion of the mold in an angular direction from its normal position so as to practically close said lateral opening thereby at the same time changing the normal relation of the body and neck portions of the bottle to each other, a stop for limiting the degree of said angular movement, and means for locking the mold in its said normal and angular positions.

Signed at Providence, Rhode Island, this 4th day of May, 1906.

ARTHUR W. HUTCHINS.

Witnesses:
GEO. H. REMINGTON,
C. E. INCE.